3,772,307
Patented Nov. 13, 1973

3,772,307
PYRIDYLTHIO KETONES
Daniel Kaminsky, Parsippany, and Mary Wise, Dover, N.J., assignors to Warner-Lambert Company, Morris Plains, N.J.
No Drawing. Filed Nov. 5, 1971, Ser. No. 196,184
Int. Cl. C07d 31/48
U.S. Cl. 260—294.8            33 Claims

ABSTRACT OF THE DISCLOSURE

Pyridylthio ketones having the following structural formula are disclosed.

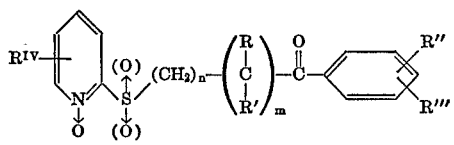

In the above R is hydrogen, lower alkyl or phenyl; R' is hydrogen, lower alkyl or phenyl; R'' and R''' may be hydrogen, alkyl, halo, alkoxy, alkylthio, methylsulfonyl, methylsulfinyl, nitro, amino, phenyl, or taken together to be methylenedioxy or benzo; $R^{IV}$ may be hydrogen, lower alkyl, halo, nitro or phenyl. The sulfur atom may be oxidized to sulfoxide, sulfone or non-oxidized as the sulfide. The values for $m$ and $n$ may be 0, 1, 2 or 3. These compounds are useful as antifungal and antibacterial agents. Some of the compounds also exhibit antisecretory and immuno suppressant activity.

The pyridylthio compounds are prepared by the reaction of a salt of a 2-mercapto pyridine-N oxide (II) (M=cationic species) with a suitably substituted compound III (where X=chloro or bromo) in an

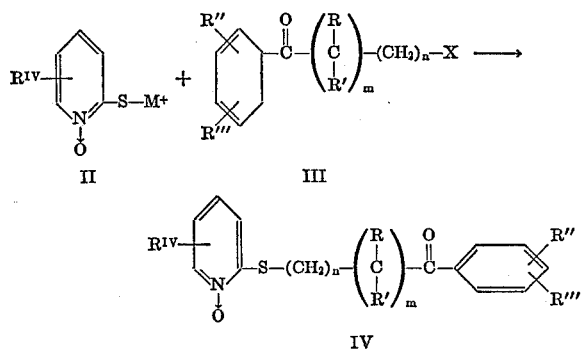

appropriate solvent (such as water, alcohols, DMSO, DMF, acetonitrile, etc.). These reactions are usually carried out above room temperature and when complete, the product is precipitated (if necessary) by addition of water and cooling.

Oxidation of the pyridylthio compounds of type IV with peracids such as m-chloroperbenzoic, performic or peracetic give the pyridylsulfinyl compounds of type V.

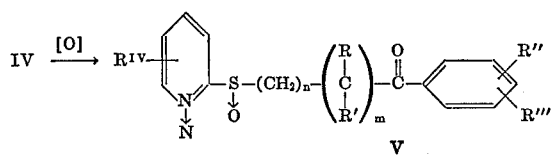

Oxidation of compounds of type IV with at least two moles of oxidizing agent results in the preparation of keto sulfones of type VI. The same compounds are prepared by the oxidation of sulfoxides of type V.

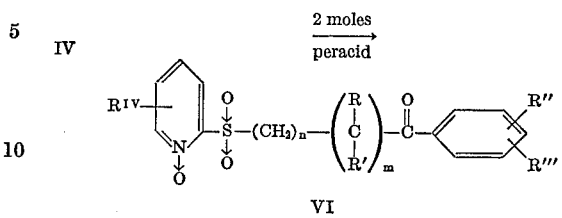

These compounds are useful as anti-fungal and antibacterial agents. Some of the compounds also exhibit anti-secretory and immunosuppressant activity.

The present invention is concerned with pyridylthio ketones as well as their sulfones and sulfoxides, having the following structural formula:

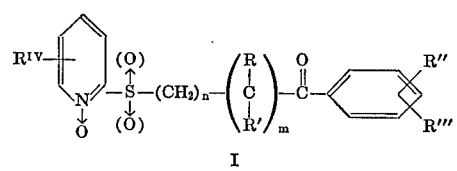

wherein R is hydrogen, lower alkyl or phenyl; R' is hydrogen, lower alkyl or phenyl; R'' and R''' are hydrogen, lower alkyl, halo, lower alkoxy, substituted lower alkyl, preferably lower alkyl thio such as methylthio, methylsulfinyl, methylsulfonyl, nitro, amino, phenyl, aralkylalkoxy or taken together to be methylenedioxy or benzo; and $R^{IV}$ is hydrogen, lower alkyl, halo, nitro or phenyl. The sulfur atom may be oxidized to sulfoxide, sulfone or non-oxidized as the sulfide. The values for $m$ and $n$ may be 0, 1, 2 or 3.

As used in this disclosure, the term lower alkyl is meant to be an aliphatic carbon chain containing 1 to 6 carbon atoms, e.g., methyl, ethyl, propyl, isopropyl and the like.

The above described novel compounds possess potent anti-fungal and anti-bacterial properties. For example, they exhibit anti-fungal activity against the organism *Pityrosporum ovale*. This organism has been identified as a major cause of dandruff. These compounds have been found active at the concentration of 1–10 µg./ml. against this organism. Further, the activity is comparable to zinc pyrithione, an agent known to be active against this organism. In addition, some of the compounds exhibit antisecretory and immunosuppressant activity as indicated hereinafter. The immunosuppressant activity is comparable to those compounds described in now abandoned U.S. patent application Ser. No. 39,895. They are to be used in the same manner as the compounds disclosed therein.

In order to use the above compounds, they are formulated with a topically acceptable vehicle such as talc or petrolatum, the active ingredient being present in an amount of about 0.2–50% by weight. They can also be incorporated into shampoos at the concentration of about 0.2–50% by weight.

Generally speaking, the above dosage forms containing the active ingredients are applied to the site liberally 1 to 3 times daily. In the case of shampoos, the hair is washed in the usual manner with the shampoo once or twice a week.

According to the present invention, the above compounds are prepared as follows:

The pyridylthio compounds may be prepared by permitting the reaction of a salt of a 2-mercapto pyridine-N oxide (II) (M=cationic species) with a suitably substituted compound III (where X-chloro or bromo) in an

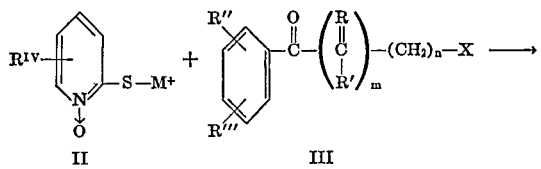

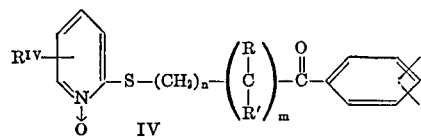

appropriate solvent (such as water, alcohols, DMSO, DMF, acetonitrile, etc.). These reactions are usually carried out above room temperature and when complete, the product is precipitated (if necessary) by addition of water and cooling.

Oxidation of the pyridylthio compounds of type IV with peracids such as m-chloroperbenzoic, performic or peracetic give the pyridylsulfinyl compounds of type V.

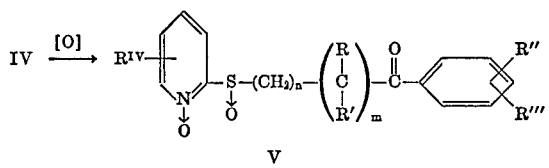

Oxidation of compounds of type IV with at least two moles of oxidizing agent, e.g., the above-mentioned peracids, results in the production of keto sulfones of type VI. The same compounds are prepared by oxidation of sulfoxides of type V.

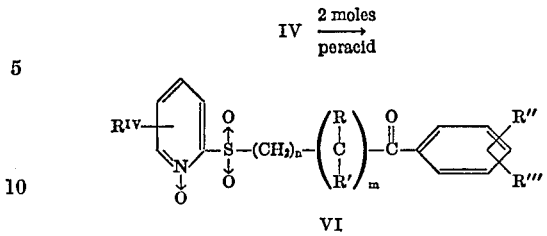

In order to further illustrate the practice of this invention, the following examples are given.

EXAMPLE 1

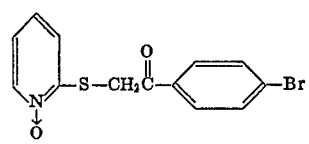

4′-bromo-2-(2-pyridylthio)acetophenone N-oxide

A mixture of 34.9 g. (0.234 mole) of the sodium salt of 2-mercaptopyridine N-oxide and 62 g. (0.223 mole) of p-bromophenacyl bromide in 400 ml. of methanol was refluxed for 7 hr. and filtered. Additional solid was obtained from concentration of the filtrate. The combined solids were washed with water and recrystallized from methanol to constant melting point, 186–187.5°. The total yield was 69 g. (0.213 mole, 95.0%).

*Analysis.*—Calcd. for $C_{13}H_{10}NO_2BrS$ (percent): C, 48.16; N, 4.32; S, 9.89; Br, 24.65. Found (percent): C, 48.29; H, 3.24; N, 4.35; S, 10.00; Br, 24.36.

By analogous procedures, utilizing the appropriate halo ketones, were prepared the additional compounds listed in Table I.

TABLE I

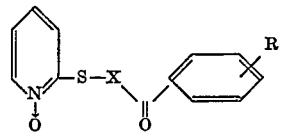

| X | R | M.P. | Molecular formula | Calcd., percent C | H | N | Found, percent C | H | N |
|---|---|---|---|---|---|---|---|---|---|
| CH₂ | H | 133–135 | $C_{13}H_{11}NSO_2$ | 63.65 | 4.52 | 5.71 | 63.67 | 4.50 | 5.62 |
| CH₂ | 4-Cl | 174–175 | $C_{13}H_{10}ClNSO_2$ [a] | 55.82 | 3.60 | 5.01 | 55.86 | 3.53 | 4.98 |
| CH₂ | 4-F | 194–196 | $C_{13}H_{10}FNSO_2$ | 59.30 | 3.83 | 5.32 | 59.01 | 3.81 | 5.20 |
| CH₂ | 3,4-(OH)₂ | [b]252–253 | $C_{13}H_{11}NSO_4$ | 56.31 | 4.00 | 5.05 | 56.15 | 4.10 | 5.02 |
| CH₂ | 2,4-(CH₃)₂ | 106–108 | $C_{15}H_{15}NSO_2$ | 65.91 | 5.53 | 5.12 | 65.73 | 5.60 | 4.98 |
| CH₂ | 4-OCH₃ | 139–141 | $C_{14}H_{13}NSO_3$ [a] | 61.07 | 4.76 | 5.09 | 61.00 | 4.73 | 4.99 |
| CH₂ | 4-φ | 160–161 | $C_{19}H_{15}NSO_2$ | 71.01 | 4.70 | 4.36 | 71.15 | 4.69 | 4.35 |
| CH₂ | 4-OCH₂φ | 110–111 | $C_{20}H_{17}NSO_3$ | 68.36 | 4.88 | 3.99 | 68.38 | 4.67 | 3.86 |
| CH₃<br>—CH— | H | 99–100 | $C_{14}H_{13}NSO_2$ | 64.84 | 5.05 | 5.40 | 64.66 | 4.97 | 5.18 |
| CH₃<br>—CH— | 4-OCH₃ | 91–93 | $C_{15}H_{15}NSO_3$ | 62.26 | 5.23 | [c]11.08 | 62.08 | 5.20 | [c]11.18 |
| π<br>—CH— | H | 147–148 | $C_{19}H_{15}NSO_2$ | 71.01 | 4.70 | 4.36 | 70.99 | 4.74 | 4.11 |
| —CH₂CH₂— | H | 146–148 | $C_{14}H_{13}NSO_2$ | 64.84 | 5.05 | 5.40 | 64.72 | 5.10 | 5.14 |
| —CH₂CH₂— | 4-Cl | 156–158 | $C_{14}H_{12}ClNSO_2$ | 57.24 | 4.12 | 4.77 | 57.28 | 4.10 | 4.61 |
| —CH₂CH₂— | 4-Br | [b]169–171 | $C_{14}H_{12}BrNSO_2$ | 49.72 | 3.58 | 4.14 | 49.86 | 3.50 | 4.16 |
| —CH₂CH₂— | 4-F | 174–176 | $C_{14}H_{12}FNSO_2$ | 60.64 | 4.36 | 5.05 | 60.74 | 4.41 | 5.07 |
| —CH₂CH₂— | 4-OCH₃ | 157–158 | $C_{15}H_{15}NSO_2$ | 62.26 | 5.23 | 4.84 | 62.29 | 5.22 | 4.74 |
| —(CH₂)₃— | H | 86–88 | $C_{15}H_{15}NSO_2$ | 65.91 | 5.53 | 5.12 | 65.62 | 5.53 | 4.92 |
| —(CH₂)₃— | 4-Br | 120–121 | $C_{15}H_{14}BrNSO_2$ | 51.15 | 4.01 | 3.98 | 51.27 | 4.10 | 3.94 |
| —(CH₂)₃— | 4-F | 113–114 | $C_{15}H_{14}FNSO_2$ | 61.84 | 4.84 | 4.81 | 62.12 | 4.68 | 4.61 |
| —CH₂— | 3,4-benzo | 169–171 | $C_{17}H_{13}NO_2S$ | 69.13 | 4.44 | 4.74 | 69.00 | 4.35 | 4.61 |
| —CH₂—CH₂— | 4-SCH₃ | 161–163 | $C_{15}H_{15}NO_2S_2$ | 58.99 | 4.95 | 4.59 | 59.25 | 5.04 | 4.66 |
| —CH₂—CH₂— | 4-SO₂CH₃ | 187–188 | $C_{15}H_{15}NO_4S_2$ | 53.40 | 4.48 | 4.15 | 53.28 | 4.57 | 4.06 |
| CH₃<br>—C—<br>CH₃ | H | 79–81 | $C_{15}H_{15}NO_2S$ [a] | 65.91 | 5.53 | 5.12 | 65.93 | 5.45 | 5.06 |

[a] Also exhibits immunosuppressant activity.
[b] Decomposes.
[c] Sulfur analysis.

EXAMPLE 2

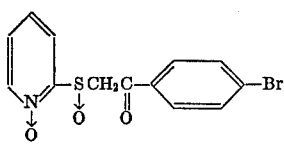

4'-bromo-2-(2-pyridylsulfinyl)acetophenone N-oxide

To a solution of 8.1 g. (0.025 mole) of 4'-bromo-2-(2-pyridylthio)acetophenone N-oxide in 1 l. of methylene chloride cooled in ice-water was added 5.47 g. (0.026 mole) of 83% m-chloroperbenzoic acid. The mixture was gradually warmed to room temperature and was stirred for 3 hours. The solution was washed with aqueous sodium bicarbonate and water, was dried and concentrated to give 4.5 g. (0.0135 mole, 52.9%) of a solid material. The solid was recrystallized from methanol-water to constant melting point, 180.5–181.5°.

*Analysis.*—Calcd. for $C_{13}H_{10}NO_3BrS$ (percent): C, 45.90; H, 2.96; N, 4.12; S, 9.42; Br, 23.49. Found (percent): C, 46.14; H, 2.97; N, 3.94; S, 9.23; Br, 23.70.

By analogous procedures, utilizing the appropriate thio ketones, were prepared the compounds listed in Table II.

solution was washed with aqueous sodium bicarbonate and water, was dried and concentrated to give 10.3 g. (96%) of a solid which was recrystallized from ethanol, melting point, 159–61°.

*Analysis.*—Calcd. for $C_{13}H_{10}NO_4BrS$ (percent): C, 43.83; H, 2.83; N, 3.93; S, 9.00; Br, 22.43. Found (percent): C, 44.10; H, 2.84; N, 3.71; S, 9.00; Fr, 22.31.

EXAMPLE 4

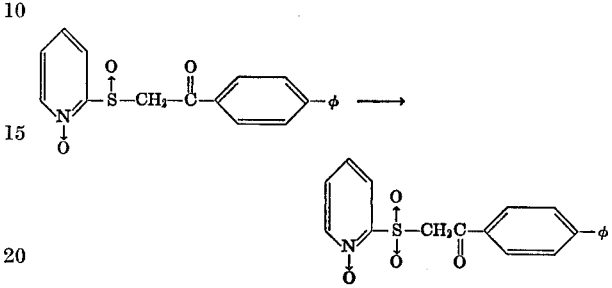

4'-phenyl-2-(2-pyridylsulfonyl)acetophenone N-oxide

TABLE II

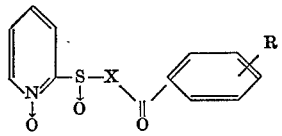

| X | R | M.P. | Molecular formula | Calcd., percent | | | Found, percent | | |
|---|---|---|---|---|---|---|---|---|---|
| | | | | C | H | N | C | H | N |
| CH₂ | 4-Cl | b177–179 | $C_{13}H_{10}ClNSO_3$ | 52.80 | 3.41 | 4.74 | 52.93 | 3.41 | 4.57 |
| CH₂ | 4-F | 150–152 | $C_{13}H_{10}FNSO_3$ | 55.91 | 3.61 | 5.02 | 55.84 | 3.62 | 4.90 |
| CH₂ | 2,4-(CH₃)₂ | 153–155 | $C_{15}H_{15}NSO_3$ | 62.26 | 5.23 | 4.84 | 62.28 | 5.30 | 4.87 |
| CH₂ | 4-OCH₃ | b170–172 | $C_{14}H_{13}NSO_4$ | 57.33 | 4.12 | 4.78 | 56.97 | 4.09 | 4.65 |
| CH₂ | 4-Φ | b153–154 | $C_{19}H_{15}NSO_3$ | 67.64 | 4.48 | 4.15 | 67.55 | 4.51 | 3.94 |
| CH₂ | 4-OCH₂Φ | b202–203 | $C_{20}H_{17}NSO_4$ | 65.38 | 4.66 | 3.81 | 65.29 | 4.56 | 3.94 |
| —CH— (CH₃) | H | b136–137 | $C_{14}H_{13}NSO_3$ | 61.07 | 4.76 | 5.09 | 60.79 | 4.74 | 5.03 |
| —CH— (CH₃) | 4-OCH₃ | 132–133 | $C_{15}H_{15}NSO_4$ | 59.00 | 4.95 | 4.59 | 58.63 | 4.95 | 4.37 |
| —CH— (Φ) | H | b160–162 | $C_{19}H_{15}NSO_3$ | 67.64 | 4.48 | 4.15 | 67.86 | 4.38 | 3.98 |
| —(CH₂)₂— | H | 128–130 | $C_{14}H_{13}NSO_3$ | 61.07 | 4.76 | 5.09 | 61.18 | 4.85 | 5.07 |
| —(CH₂)₂— | 4-Cl | 134–135 | $C_{14}H_{12}ClNSO_3$ a | 54.28 | 3.90 | 4.52 | 54.27 | 3.85 | 4.72 |
| —(CH₂)₂— | 4-F | 120–121 | $C_{14}H_{12}FNSO_3$ | 57.33 | 4.12 | 4.78 | 56.97 | 4.09 | 4.65 |
| —(CH₂)₂— | 4-OCH₃ | 113–114 | $C_{15}H_{15}NSO_4$ | 59.00 | 4.95 | 4.59 | 58.95 | 4.92 | 4.42 |
| —(CH₂)₃— | H | 156–158 | $C_{15}H_{15}NSO_3$ | 62.26 | 5.23 | 4.84 | 62.48 | 5.25 | 4.68 |
| —(CH₂)₃— | 4-Br | 137–139 | $C_{15}H_{14}BrNSO_3$ | 48.92 | 3.83 | 3.80 | 48.72 | 3.87 | 3.66 |
| —(CH₂)₃— | 4-F | 135–136 | $C_{15}H_{14}FNSO_3$ a | 58.62 | 4.59 | 4.56 | 58.37 | 4.59 | 4.62 |
| —CH₂— | 3,4-benzo | 74–76 | $C_{17}H_{13}NO_2S$ | 69.13 | 4.43 | 4.74 | 69.01 | 4.45 | 4.62 |
| —CH₂CH₂— | 4-SCH₃ | 129–131 | $C_{15}H_{15}NO_3S_2$ | 56.05 | 4.70 | 4.36 | 56.26 | 4.85 | 4.18 | a Also exhibits immunosuppressant activity.
b Decomposes.

EXAMPLE 3

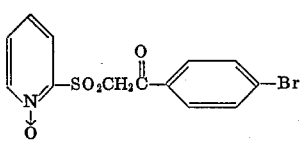

4'-bromo-2-(2-pyridylsulfonyl)acetophenone N-oxide

To an ice-cold solution of 9.7 g. (0.03 mole) of 4'-bromo-2-(2-pyridylthio)acetophenone N-oxide in 500 ml. of methylene chloride was added 12.5 g. of 83% m-chloroperbenzoic acid (0.06 mole). The solution was gradually warmed to room temperature, and stirring was continued for 20 hours, when TLC indicated the absence of starting material and formation of a new product. The To a mixture of 0.02 mole of 4'-phenyl-2-(2-pyridylsulfinyl)acetophenone N-oxide in 200 ml. of CH₂Cl₂ was added in ca. 10 portions over 2 hrs. with stirring, 0.06 mole of m-chloroperbenzoic acid. The mixture was stirred for an additional 2 hrs., 300 ml. of CH₂Cl₂ added and the organic phase was extracted with saturated aq. NaHCO₃ and dried over anh. MgSO₄. Removal of solvent and trituration of residue with cold methanol yielded >90% of lt. tan product. Several recrystallizations from 4:1 EtOH:DMF (Florisil) gave colorless crystals, M.P. 148–188°.

*Analysis.*—Calcd. for $C_{19}H_{15}NSO_4$ (percent): S, 65.58; H, 4.28; N, 3.96; S, 9.07. Found (percent): C, 64.66; H, 4.33; N, 4.07; S, 9.03.

By procedures analgous to Examples 3 and 4 were prepared the keto sulfones listed in Table III.

TABLE III

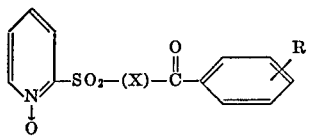

| X | R | M.P. | Molecular formula | Calcd., percent | | | Found, percent | | |
|---|---|---|---|---|---|---|---|---|---|
| | | | | C | H | N | C | H | N |
| $CH_2$ | H | 134–135 | $C_{13}H_{11}NSO_4$ | 56.31 | 4.00 | c 11.56 | 56.29 | 4.05 | c 11.59 |
| $CH_2$ | 4-F | 138–139 | $C_{13}H_{10}FNSO_4$a | 52.88 | 3.41 | 4.74 | 52.57 | 3.57 | 4.59 |
| $CH_2$ | 4-$OCH_3$ | 114–116 | $C_{14}H_{13}FNSO_5$ | 54.72 | 4.26 | 4.56 | 54.85 | 4.55 | 4.86 |
| $CH_2$ | 2,4-$(CH_3)_2$ | 150–151 | $C_{15}H_{15}NSO_4$ | 59.00 | 4.95 | 4.59 | 58.83 | 4.98 | 4.52 |
| $\underset{-\overset{|}{CH}-}{CH_3}$ | H | b 185–186 | $C_{14}H_{13}NSO_4$ | 57.72 | 4.50 | 4.81 | 57.50 | 4.45 | 4.54 |
| $\underset{-\overset{|}{CH}-}{CH_3}$ | 4-$OCH_3$ | 162–164 | $C_{15}H_{15}NSO_5$ | 56.06 | 4.71 | 4.36 | 55.82 | 4.71 | 4.22 |
| $\underset{-\overset{|}{CH}-}{\phi}$ | H | b 198–199 | $C_{19}H_{15}NSO_4$a | 64.58 | 4.28 | 3.96 | 64.63 | 4.43 | 3.72 |
| $-(CH_2)_2-$ | H | 177–179 | $C_{14}H_{13}NSO_4$a | 57.72 | 4.50 | 4.81 | 57.92 | 4.58 | 4.76 |
| $-(CH_2)_2-$ | 4-Cl | 140–142 | $C_{14}H_{12}ClNSO_4$a | 51.62 | 3.71 | 4.30 | 51.54 | 3.68 | 4.15 |
| $-(CH_2)_2-$ | 4-F | 182–184 | $C_{14}H_{12}FNSO_4$ | 54.36 | 3.91 | 4.53 | 54.61 | 3.86 | 4.26 |
| $-(CH_2)_2-$ | 4-$OCH_3$ | 146–148 | $C_{15}H_{15}NSO_4$ | 56.06 | 4.71 | 4.36 | 55.77 | 4.73 | 4.16 |
| $-(CH_2)_3-$ | H | 112–114 | $C_{15}H_{15}NSO_4$ | 59.00 | 4.95 | 4.59 | 58.91 | 5.02 | 4.46 |
| $-(CH_2)_3-$ | 4-Br | 128–130 | $C_{15}H_{14}BrNSO_4$ | 46.89 | 4.67 | 3.65 | 47.03 | 3.68 | 3.56 |
| $-(CH_2)_3-$ | 4-F | 133–134 | $C_{15}H_{14}FNSO_4$a | 55.72 | 4.36 | 4.33 | 55.91 | 4.53 | 4.50 |
| $-CH_2-$ | 3,4-benzo | 143–145 | $C_{17}H_{13}NO_3S$ | 65.58 | 4.21 | 4.50 | 65.29 | 4.15 | 4.73 |
| $-CH_2-CH_2-$ | 4-$SCH_3$ | 173–175 | $C_{15}H_{15}NO_4S_2$ | 53.40 | 4.48 | 4.15 | 53.25 | 4.67 | 3.97 |
| $-CH_2CH_2$ | 4-$SO_2CH_3$ | 180–181 | $C_{15}H_{15}NO_6S_2$ | 48.77 | 4.09 | 3.79 | 48.98 | 4.18 | 4.02 | a Also exhibits immunosuppressant activity.
b Decomposes.
c Sulfur analysis.

EXAMPLE 5

A typical shampoo composition is prepared by mixing together the following ingredients in water:

Homologues of dibasic aliphatic acid esters, available under the trade name Stanapol SH–100 (30% active) from Standard Chemical Products, ml. ___ 25
30% active sodium lauryl sulfate, ml. _____ 25
Compound of Example 1, grams _____ 2
Water to make, 100 ml.

Other compounds of this invention are also prepared as shampoos in the same manner as described.

We claim:

1. A compound of the formula:

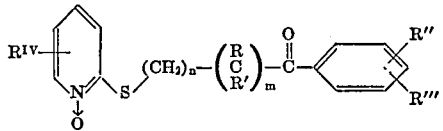

wherein R is hydrogen, lower alkyl or phenyl; R' is hydrogen, lower alkyl or phenyl; R" and R'" are each hydrogen, alkyl, having 1 to 6 carbon atoms, halo, loweralkylthio, phenyl lower alkoxy lower alkoxy, in which alkoxy has from 1 to 6 carbon atoms, nitro, amino, phenyl, or taken together to form benzo; $R^{IV}$ is hydrogen and m and n have a value of 0, 1, 2 or 3.

2. A compound according to claim 1 wherein n is 1, m is 0, R'=$R^{IV}$=H and R'"=p-methoxy.

3. A compound according to claim 1 wherein n is 1, m is 0, R"=$R^{IV}$=H and R'"=p-chloro.

4. A compound according to claim 1 wherein n is 2, m is 0, R"=R'"=$R^{IV}$=H.

5. A compound according to claim 1 wherein n is 2, m is 0, R"=$R^{IV}$=H and R'" is p-bromo.

6. A compound according to claim 1 wherein n is 2, m is 0, R"=$R^{IV}$=H and R'"=p-chloro.

7. A compound according to claim 1 wherein n is 2, m is 0, R"=$R^{IV}$=H and R'"=p-fluoro.

8. A compound according to claim 1 wherein n is 2, m is 0, R"=$R^{IV}$=H and R'"=p-methoxy.

9. A compound according to claim 1 wherein n is 2, m is 0, R"=$R^{IV}$=H and R'"=p-methylsulfonyl.

10. A compound according to claim 1 wherein n is 2, m is 0, R"=$R^{IV}$=H and R'"=p-methylsulfinyl.

11. A compound according to claim 1 wherein n is 2, m is 0, R"=$R^{IV}$=H and R'"=p-methylthio.

12. A compound according to claim 1 wherein n is 3, m is 0, R"=$R^{IV}$=H and R'" is p-bromo.

13. A compound according to claim 1 wherein n is 0, m is 1, R=R'=$CH_3$ and R"=R'"=$R^{IV}$=H.

14. A compound of the formula:

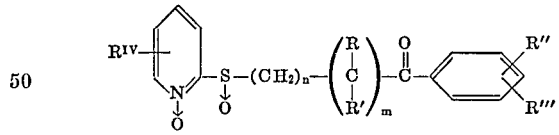

wherein R is hydrogen, lower alkyl or phenyl, R' is hydrogen, lower alkyl, having 1 to 6 carbon atoms, or phenyl, R" and R'" are each hydrogen, lower alkyl, halo, lower alkylthio, phenyl lower alkoxy, lower alkoxy, in which alkoxy has from 1 to 6 carbon atoms, nitro, amino, phenyl, or taken together to form benzo, $R^{IV}$ is hydrogen and m and n have a value of 0, 1, 2 or 3.

15. A compound according to claim 14 wherein $n=0$, $m=1$, R=$CH_3$, R'=R"=R'"=$R^{IV}$=H.

16. A compound according to claim 14 wherein $n=1$, $m=0$, R"=$R^{IV}$=H and R'"=p-bromo.

17. A compound according to claim 14 wherein $n=2$, $m=0$ and R"=R'"=$R^{IV}$=H.

18. A compound according to claim 14 wherein $n=2$, $m=0$, R"=$R^{IV}$=H and R'"=p-chloro.

19. A compound according to claim 14 wherein $n=2$, $m=0$, R"=$R^{IV}$=H and R'"=p-bromo.

20. A compound according to claim 14 wherein $n=2$, $m=0$, R"=$R^{IV}$=H and R'"=p-fluoro.

21. A compound according to claim 14 wherein $n=2$, $m=0$, R"=$R^{IV}$=H and R'"=p-methoxy.

22. A compound according to claim 14 wherein $n=2$, $m=0$, R"=$R^{IV}$=H and R'"=p-methylthio.

23. A compound according to claim 14 wherein $n=3$, $m=0$, $4''=R^{IV}=H$ and $R'''=$p-fluoro.

24. A compound of the formula:

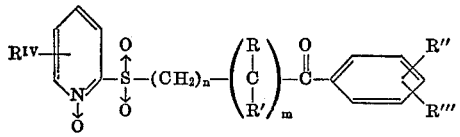

wherein R is hydrogen, lower alkyl or phenyl, R' is hydrogen, lower alkyl, having 1 to 6 carbon atoms, or phenyl, R'' and R''' are each hydrogen, lower alkyl, halo, lower alkylthio, phenyl lower alkoxy, lower alkoxy, in which alkoxy has from 1 to 6 carbon atoms, nitro, amino, phenyl, or taken together to form benzo, $R^{IV}$ is hydrogen and $m$ and $n$ have a value of 0, 1, 2 or 3.

25. A compound according to claim 24 wherein $n=1$, $m=0$ and $R''=R'''=R^{IV}=H$.

26. A compound according to claim 24 wherein $n=1$, $m=0$, $R''=R^{IV}=H$ and $R'''=$p-fluoro.

27. A compound according to claim 24 wherein $n=1$, $m=0$, $R''=R^{IV}=H$ and $R'''=$p-phenyl.

28. A compound according to claim 24 wherein $n=1$, $m=0$, $R''=R^{IV}=H$ and $R'''=$2,4-dimethyl.

29. A compound according to claim 24 wherein $n=2$, $m=0$, $R''=R'''=R^{IV}=H$.

30. A compound according to claim 24 wherein $n=2$, $m=0$, $R''=R^{IV}=H$ and $R'''=$p-chloro.

31. A compound according to claim 24 wherein $n=2$, $m=0$, $R''=R^{IV}=H$ and $R'''=$p-fluoro.

32. A compound according to claim 24 wherein $n=3$, $m=0$, $R''=R^{IV}=H$ and $R'''=$p-fluoro.

33. A compound according to claim 24 wherein $n=0$, $m=1$, $R'=\emptyset$ and $R=R''=R'''=R^{IV}=H$.

References Cited

Djerassi, Carl et al.: "The Reaction of α-Halo Ketones With 2-Pyridine-Thiol," Apr. 7, 1954, J. Amer. Chem. Soc., vol. 76, pp. 4470–4472.

Fieser, Louis et al.: "Advanced Organic Chemistry," 1962, pp. 312 and 313.

HENRY R. JILES, Primary Examiner

M. A. M. CROWDER, Assistant Examiner

U.S. Cl. X.R.

260—294.8 C, 294.8 E; 424—263